United States Patent [19]

Abe

[11] Patent Number: 4,982,712
[45] Date of Patent: Jan. 8, 1991

[54] IGNITION TIMING CONTROL SYSTEM FOR AN ENGINE

[75] Inventor: Kunihiro Abe, Tokyo, Japan

[73] Assignee: Fuji Jukogyo Kabushiki Kaisha, Tokyo, Japan

[21] Appl. No.: 379,277

[22] Filed: Jul. 13, 1989

[30] Foreign Application Priority Data

Jul. 21, 1988 [JP] Japan .................................. 63-182200

[51] Int. Cl.$^5$ .............................................. F02P 5/15
[52] U.S. Cl. ..................................... 123/424; 123/421
[58] Field of Search ................... 123/179 BG, 421, 424

[56] References Cited

U.S. PATENT DOCUMENTS

| | | | |
|---|---|---|---|
| 4,351,297 | 9/1982 | Suematsu | 123/421 |
| 4,570,596 | 2/1986 | Sato | 123/421 |
| 4,694,799 | 9/1987 | Yagi et al. | 123/425 |

FOREIGN PATENT DOCUMENTS

60-47877 3/1985 Japan.

Primary Examiner—Tony M. Argenbright
Attorney, Agent, or Firm—Beveridge, DeGrandi & Weilacher

[57] ABSTRACT

An ignition timing control system for an engine includes a starting judgment unit for judging a starting state of the engine, an ignition timing setting unit for setting an ignition timing of the engine, and an initial ignition timing setting unit. The ignition timing setting unit sets an ignition timing in accordance with an ignition map stored in a memory by using an engine load and engine speed as parameters, respectively. The initial ignition timing setting unit gradually advances an ignition timing from the fixed ignition timing side to the set ignition timing side immediately after starting of the engine in dependency on the judgment of the starting judgment unit. Advancing the ignition timing, improves the starting operation of the engine.

12 Claims, 5 Drawing Sheets

IGNITION TIMING CONTROL SYSTEM FOR AN ENGINE

BACKGROUND OF THE INVENTION

The present invention relates to an ignition timing control system for an engine to control an ignition timing for an initial or a starting period immediately after starting the engine so as to gradually advance the ignition timing from a fixed ignition timing position.

Heretofore, as an example of an ignition timing control system of this kind, there has been disclosed a system, e.g., Japanese patent application laid-open No. 61-96181. This system is based on an angular control system to detect projections or slits provided on a crank rotor rotating synchronously with a crank shaft to measure an ignition timing. Moreover, a system disclosed in Japanese patent laid-open No. 60-47877 is based on a time control system to detect the time elapsed between projections or slits provided on the crank rotor with a predetermined interval to measure the ignition timing.

Meanwhile, as the number of engine revolutions at the time of cranking is unstable, it is required to, set the ignition timing (e.g., at BTDC 10°) at the time of cranking. For this reason, many systems adopt a system to advance an ignition angle after starting of the engine to shift to ordinary ignition timing. Generally, a timing for shifting to such an ordinary ignition timing control is switched to a fixed position in dependency on an increasing rate of the detected engine revolution speed, when a starter switch is switched from an ON to an OFF state.

In an ordinary operating state where the engine revolution speed is stable, ignition timing control by the time is more advantageous than ignition timing control by the angle because of a shortened computing speed and a simplified structure.

To the contrary, for an unstable initial time period immediately after starting, it is difficult to precisely detect changes in the revolution speed.

Namely, as shown in FIG. 1 (a fixed ignition timing period at the time of cranking), where projections 1a and 1b are formed at an outer periphery of a crank rotor 1, e.g., at positions of BTDC (Before Top Dead Center) 10° and BTDC 100°, at the time of cranking, an ignition signal is output to driver (not shown) when a crank pulse produced by detecting the projection 1a is output to spark an ignition plug (FIG. 1 shows this state).

On the other hand, as shown in FIG. 2 (an ignition timing control immediately after starting), when the starter switch is turned OFF after complete firing, or when the engine speed rises to a predetermined value, the ignition timing control is switched to ordinary timing control. First, an angular velocity is calculated from a time period between the time when the projection 1a is detected and the time when the projection 1b is detected. Then the angular velocity is converted to an ignition timing (ignition angle) in dependency on the operating state to an ignition time in accordance with the calculated angular velocity. An ignition timing is therefore measured with reference to the time when the projection 1b is detected. When the timing reaches a predetermined ignition timing (BTDC 20° in FIG. 2), an ignition signal is output.

For an initial time period immediately after starting of the engine, engine speed is low and an interval of the time period $\alpha$ is elongated. When the engine revolution speed for the initial time period varies largely, even if the ignition timing is set at BTDC 20° as shown in FIG. 2, an actual ignition angle may be excessively advanced, e.g., to an extent of BTDC 30°.

As a result, combustion after complete firing becomes unstable. Thus, when the ignition timing is suddenly advanced from the fixed ignition timing, the engine revolution speed does not rise smoothly. Consequently, engine stall would occur, and the starting performance becomes unsatisfactory.

SUMMARY OF THE INVENTION

The present invention has been made in view of the above circumstances. An object of the present invention is to provide an ignition timing control system for an engine to obtain a satisfactory starting performance and smooth rise of the engine speed immediately after starting.

An ignition timing control system for an engine according to the present invention comprises starting judgment means for determining a starting state of the engine, ignition timing setting means for setting an ignition timing in accordance with an ignition timing map by using an engine load and the engine speed as parameters, respectively, and initial ignition timing setting means for gradually advancing the ignition timing immediately after the engine is determined to be in a starting state by the starting judgment means.

In accordance with the system of the present invention, the ignition timing is gradually advanced from a fixed ignition timing position to an ordinary ignition timing position immediately after starting, starting performance is therefore improved.

BRIEF DESCRIPTION OF THE DRAWINGS

FIGS. 3 to 6 show each embodiment according to the present invention, wherein FIG. 3 is a functional block diagram of an ignition timing control system, FIG. 4 is a schematic view of an engine control system, FIG. 5 is a front view of the crank rotor and FIG. 6 is a flowchart showing an ignition timing control process immediately after starting.

DETAILED DESCRIPTION OF THE PREFERRED EMBODIMENT

A preferred embodiment according to the present invention will be described with reference to the attached drawings.

Figure 4:
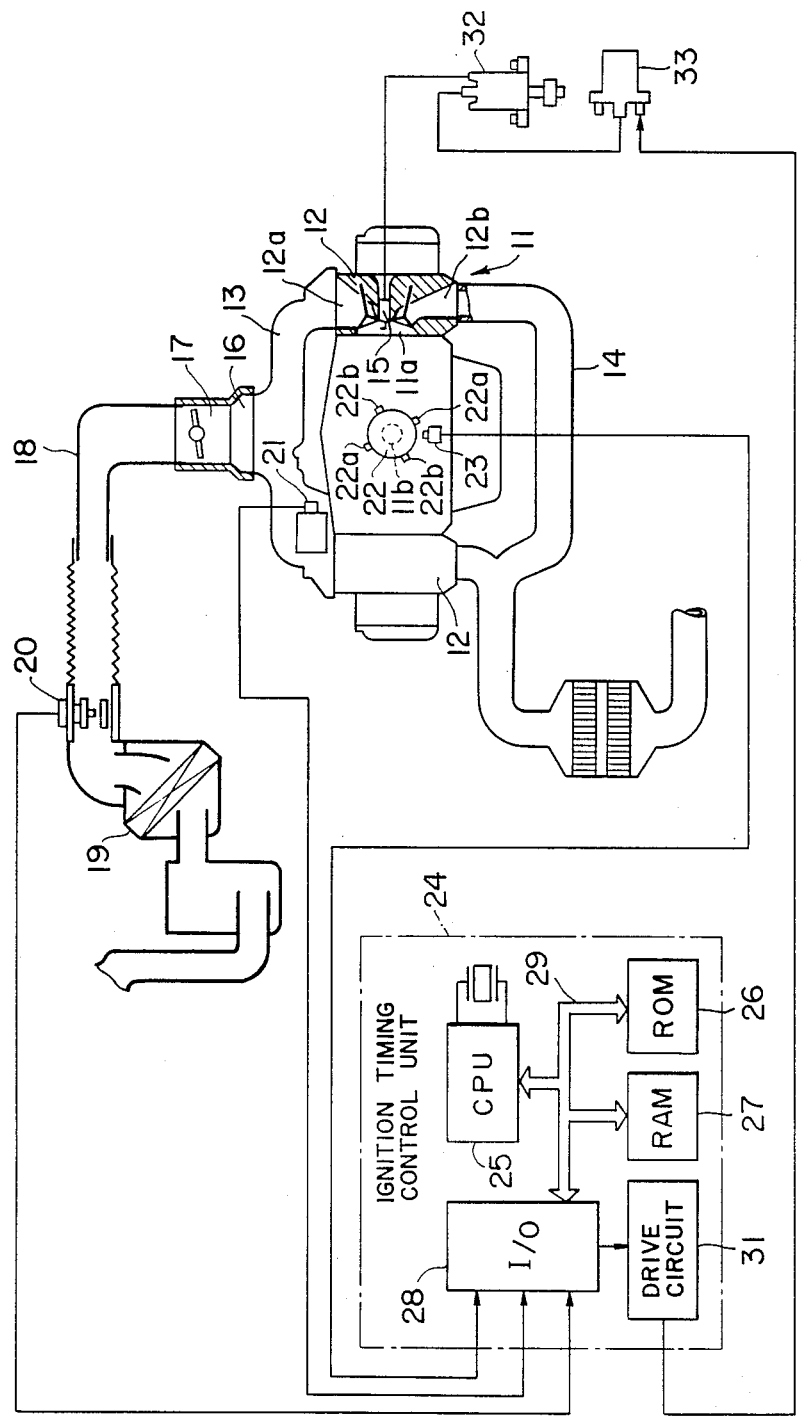

In FIG. 4, reference numeral 11 denotes an engine with four horizontally opposed cylinders. An intake manifold 13 and an exhaust manifold 14 are connected to an intake port 12a and an exhaust port 12b formed in a cylinder head 12 of the engine 11, respectively. Furthermore, an ignition plug 15 is mounted on the cylinder head 12 of a combustion chamber 11a.

A throttle chamber 17 communicates with the intake manifold 13 on an upstream side thereof through an air chamber 16. The upstream side of the throttle chamber 17 communicates with an air cleaner 19 through an intake pipe 18.

Furthermore, an intake air flow sensor (a hot wire type) 20 is inserted into the intake pipe 18 on a downstream side thereof toward the air cleaner 19. A coolant temperature sensor 21 is inserted in a coolant passage (not shown) on the intake manifold 13.

Furthermore, a crank rotor 22 is fixed on a crank shaft 11b of the engine 11, and a crank angle sensor 23 comprising an electromagnetic pick-up is provided on an outer periphery of the crank rotor 22.

Figure 5:
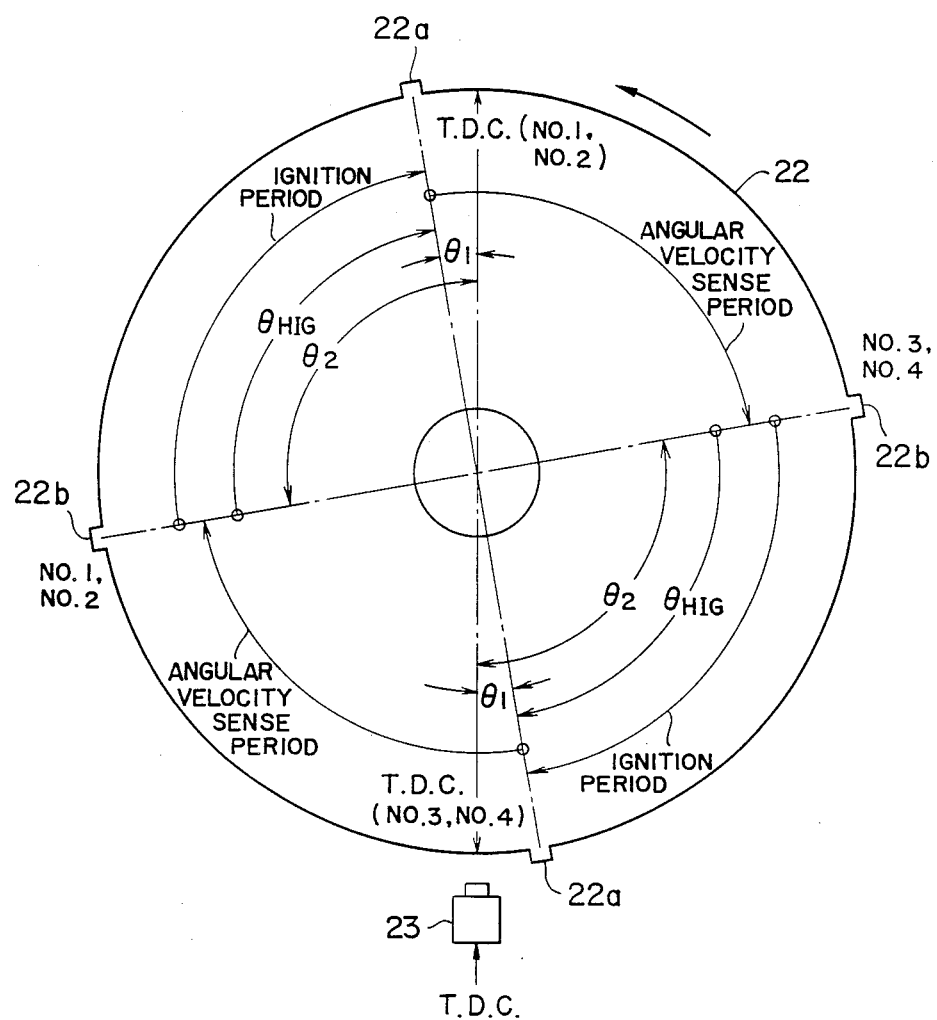

As shown in FIG. 5, projections 22a each serving as a reference point for calculating an angular velocity, and projections 22b indicating reference crank angles of respective cylinders (No. 1, No. 2, No. 3 and No. 4) are arranged at diametrically opposed positions on the outer periphery of the crank rotor 22.

For example, in this figure, setting is made such that a set angle $\theta_1$ for the projections 22a and a set angle $\theta_2$ for the projections 22b are equal to BTDC 10° and BTDC 100°, respectively.

The crank angle sensor 23 takes out an alternating current (AC) voltage produced by changes in the magnetic flux when respective projections 22a and 22b of the crank rotor 22 pass through a head of the crank angle sensor 23 to output a rotational angle signal Ne serving as a reference for detecting the engine speed and an angular velocity and a reference crank angle signal G for detecting a reference crank angle for each cylinder.

A circuit configuration of the control system will now be described.

As shown in FIG. 4, an ignition timing control unit designated by reference numeral 24 includes a central processing unit (CPU) 25, a read only memory (ROM) 26, a random access memory (RAM) 27 and an input/output (I/O) interface 28. These components are interconnected via a bus line 29. Moreover, sensor means 30 for sensing parameters of the operating condition of the engine (FIG. 3) composed of the above-mentioned sensors 20, 21 and 23 is connected to an input port of the I/O interface 28. Furthermore, a drive circuit 31 is connected to an output port of the I/O interface 29. The ignition plug 15 is connected to the drive circuit 31 through a distributor 32 and an ignition coil 33.

In the ROM 26, fixed data such as control programs and an ignition timing map $MP_{IG}$ are stored. After output signals from respective sensors of the sensor means 30 are subjected to data processing, they are stored in RAM 27. In addition, the CPU 25 computes an ignition timing by using various data stored in the RAM 27 in accordance with a control program stored in the ROM 26.

The control system thus constituted will function as follows.

Figure 1:
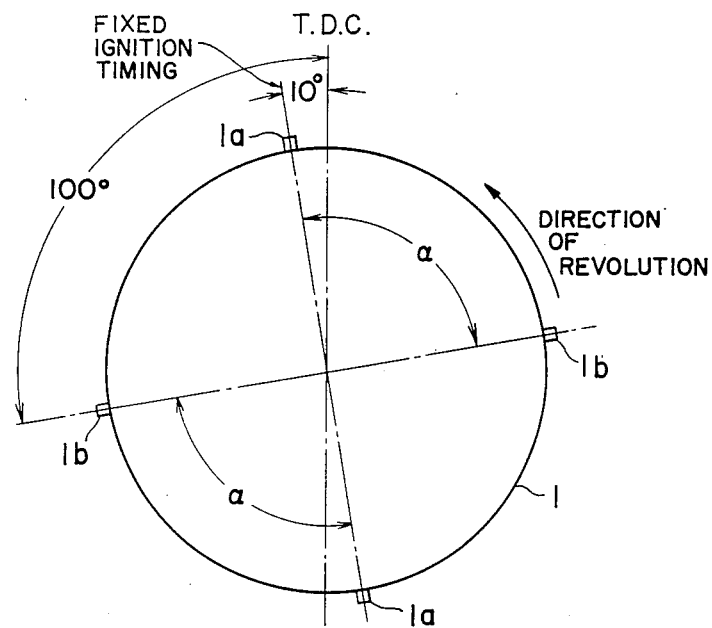
FIGS. 1 and 2 are front views of each embodiment of a crank rotor for an ignition timing control system.
Figure 2:
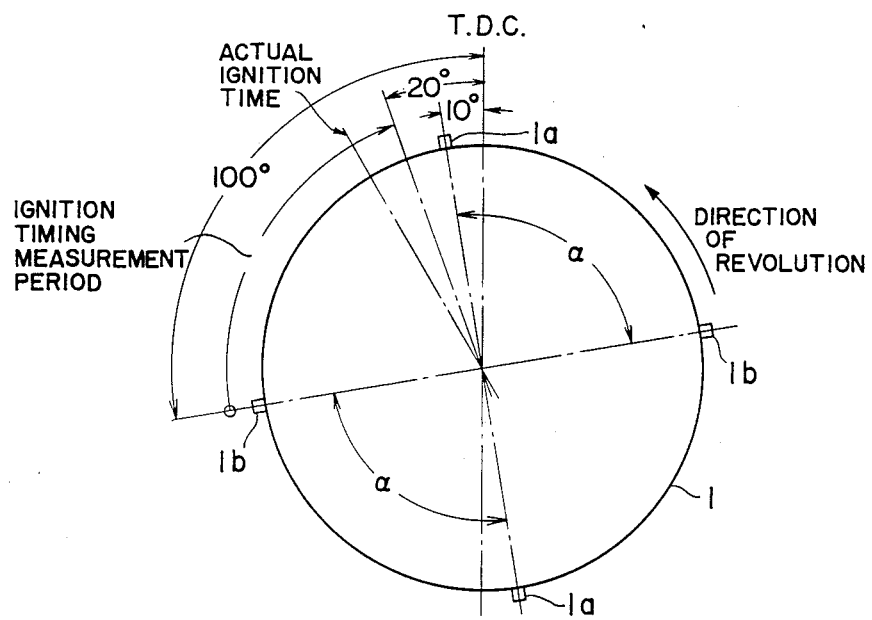
Figure 3:
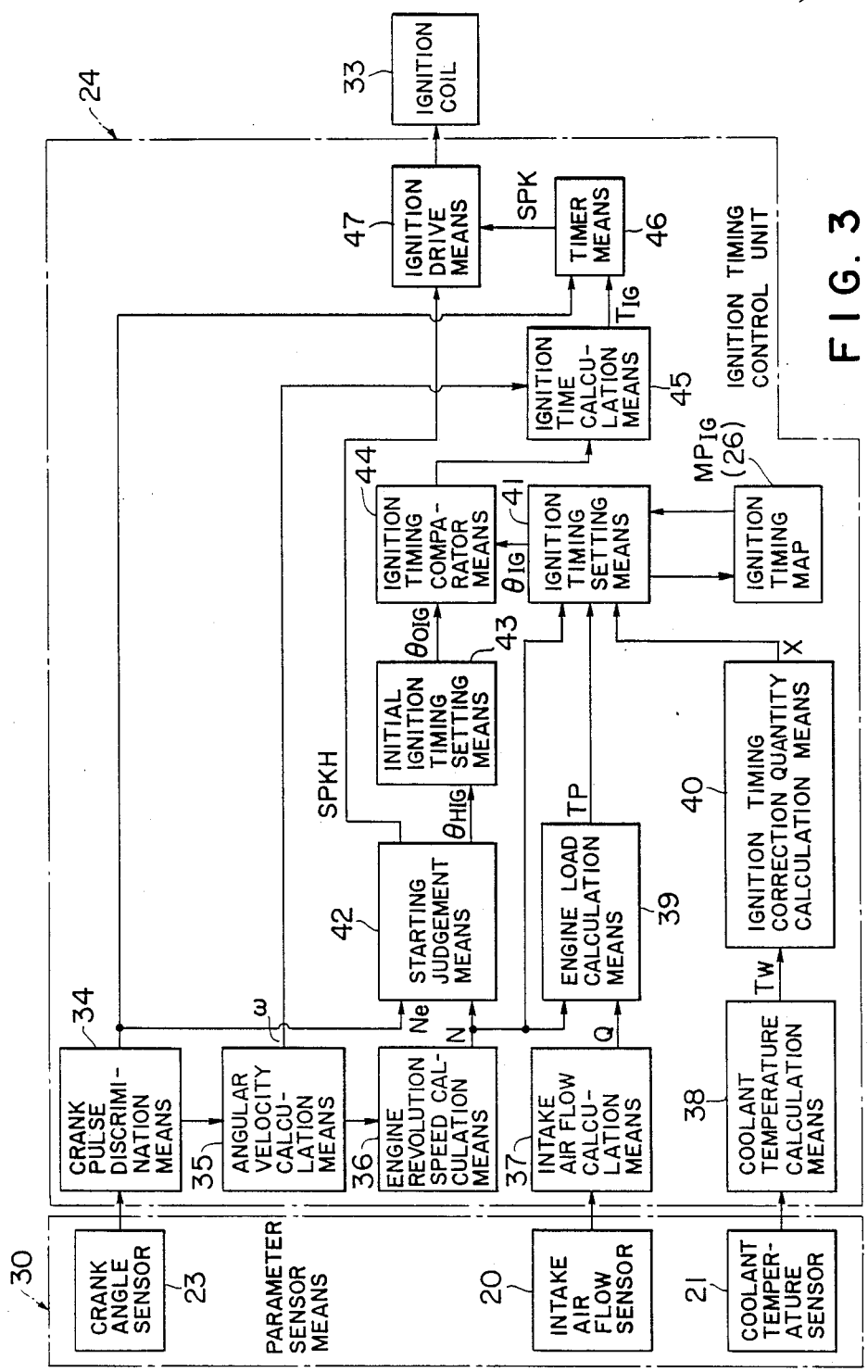

As shown in FIG. 3, the ignition timing control unit 24 comprises crank pulse discrimination means 34, angular velocity calculation means 35, engine revolution speed calculation means 36, intake air flow calculation means 37, coolant temperature calculation means 38, engine load calculation means 39, ignition timing correction quantity calculation means 40, ignition timing setting means 41, ignition timing map $MP_{IG}$, starting judgment means 42, initial ignition timing setting means 43, ignition timing comparator means 44, ignition timing calculation means 45, timer means 46 and ignition drive means 47.

The crank pulse discriminator means 34 discriminates that the output signal from the crank angle sensor 23 is a G signal produced in response to detection of the projection 22b of the crank rotor 22 or an Ne signal produced in response to detection of the projection 22a by a signal produced in response to detection of a projection of the cam rotor rotating synchronously with a cam shaft (not shown).

Thus, the cam rotor rotating synchronously with the cam shaft makes one-half of a revolution during one revolution of the crank rotor 22. By detecting the projections formed equiangularly every 90 degrees on the outer periphery of the cam rotor, it is possible to predict what signal is output from the crank angle sensor 23 after detection of the projection.

The angular velocity calculation means 35 calculates a time $T\theta$ between a time when the rotational angle signal Ne discriminated by the crank pulse discrimination means 34 is detected and a time when the next reference crank angle signal G is detected. Then, the calculation means 35 calculates an angular velocity $\omega$ of the crank shaft 11b from angular data between projections 22a and 22b of the crank rotor 22 stored in advance in the ROM 26.

The engine revolution speed calculation means 36 calculates the engine speed N (r.p.m) from the angular velocity $\omega$ calculated by the angular velocity calculation means 35.

The intake air flow calculation means 37 calculates a volume of an intake air, i.e., an intake air quantity Q passing through the intake pipe 18 in dependency on an output signal from the intake air flow sensor 20.

The coolant water temperature calculation means 38 calculates a coolant water temperature Tw from an output signal from the coolant water temperature sensor 21.

The engine load calculation means 39 calculates a fundamental fuel injection quantity Tp ($Tp = K \times Q/N$, $K$ ... constant) from the number of engine revolutions N calculated at the engine rotation number calculation means 36 and the intake air quantity Q calculated at the intake air quantity calculation means 37, and output it. This fundamental fuel injection flow Tp corresponds to an engine load.

The ignition timing correction quantity calculation means 40 calculates an ignition timing correction quantity X corresponding to data such as a coolant temperature Tw calculated at the coolant temperature calculation means 38.

The ignition timing setting means 41 specifies an area of the ignition timing map $MP_{IG}$ stored in the ROM 26. The setting means 41 uses, as respective parameters, the engine speed N calculated by the engine revolution speed calculation means 36 and a fundamental fuel injection quantity Tp calculated at the engine load calculation means 39. The ignition timing setting means 41 searches for an ignition timing angle $\theta IG$ stored in this area and corrects the ignition timing angle $\theta IG$ by using the ignition timing correction quantity X calculated at the ignition timing correction quantity calculation means to set a new ignition timing angle ($\theta IG \leftarrow \theta IG + X$).

The starting judgment means 42 judges whether or not the engine is started in dependency on the engine speed N calculated at the engine revolution speed calculation means 36.

Namely, when the engine speed N of several cycles is taken in, and when an increasing quantity $\Delta NO$, the starting judgment means 42 determines this state as a complete firing. In addition to the above-mentioned starting judgment, e.g., a method to detect the time when the starter switch is changed from ON to OFF to determine this state to be starting state, or a method to judge the state where the engine speed N is above a predetermined value (e.g., 3000 r.p.m.) to be the completely exploded state, is used.

Furthermore, before explosion is completed, the starting judgment means 42 outputs a signal Ne detected by the projection 22a (BTDC $\theta_1$) of the crank rotor 22 and output from the crank pulse discrimination means 34 to the ignition drive means 47 as a fixed ignition signal SPKH.

On the other hand, after the firing is completed, the starting judgment means 42 outputs a fixed ignition angle signal $\theta$HIG from the projection 22b to the projection 22a of the crank plate 22 as a reference to the initial ignition timing setting means 43.

The initial ignition timing setting means 43 sets an initial ignition timing $\theta$OIG obtained by gradually shifting, e.g., subtracting one degree for every engine igniting operation cycle from the fixed ignition angle signal $\theta$HIG output from the starting judgment means 42.

The ignition timing comparator means 44 compares the initial ignition timing $\theta$OIG set at the initial ignition timing setting means 43, with the ignition timing $\theta$IG set at the ignition timing setting means 41 and the difference $\Delta\theta$ is calculated. Thus, the ignition timing comparator means 44 determines whether or not the difference $|\Delta\theta|$ is within a set value $|\Delta\theta_0|$. When a condition of $|\Delta\theta| > |\Delta\theta_0|$ holds, this comparator means 44 outputs the initial ignition timing $\theta$OIG to the ignition time calculation means 45. In contrast, when $|\Delta\theta| \leq |\Delta\theta_0|$, it outputs the ignition timing $\theta$IG to the ignition timing calculation means 45.

The ignition timing calculation means 45 divides initial ignition timing $\theta$OIG or the ignition timing $\theta$IG output from the ignition timing comparator means 44 by the angular velocity $\omega$ calculated at the angular velocity calculation means 35 to calculate an ignition timing TIG ($TIG = \theta OIG/\omega$, or $TIG = \theta IG/\omega$).

The timer means 46 starts counting the ignition timing TIG calculated at the ignition timing calculation means 45 by using a signal G output from the crank pulse discrimination means 34 as a trigger signal. When a count value reaches the ignition timing TIG, the timer means 46 outputs an ignition signal SPK to the ignition drive means 47.

When a fixed ignition signal SPKH from the starting judgment means 42 or the ignition signal SPK from the timer means 46 is input to the ignition drive means 47, the primary line of the ignition coil 33 is cut off. Thus, the ignition plug 15 is sparked.

Figure 6:
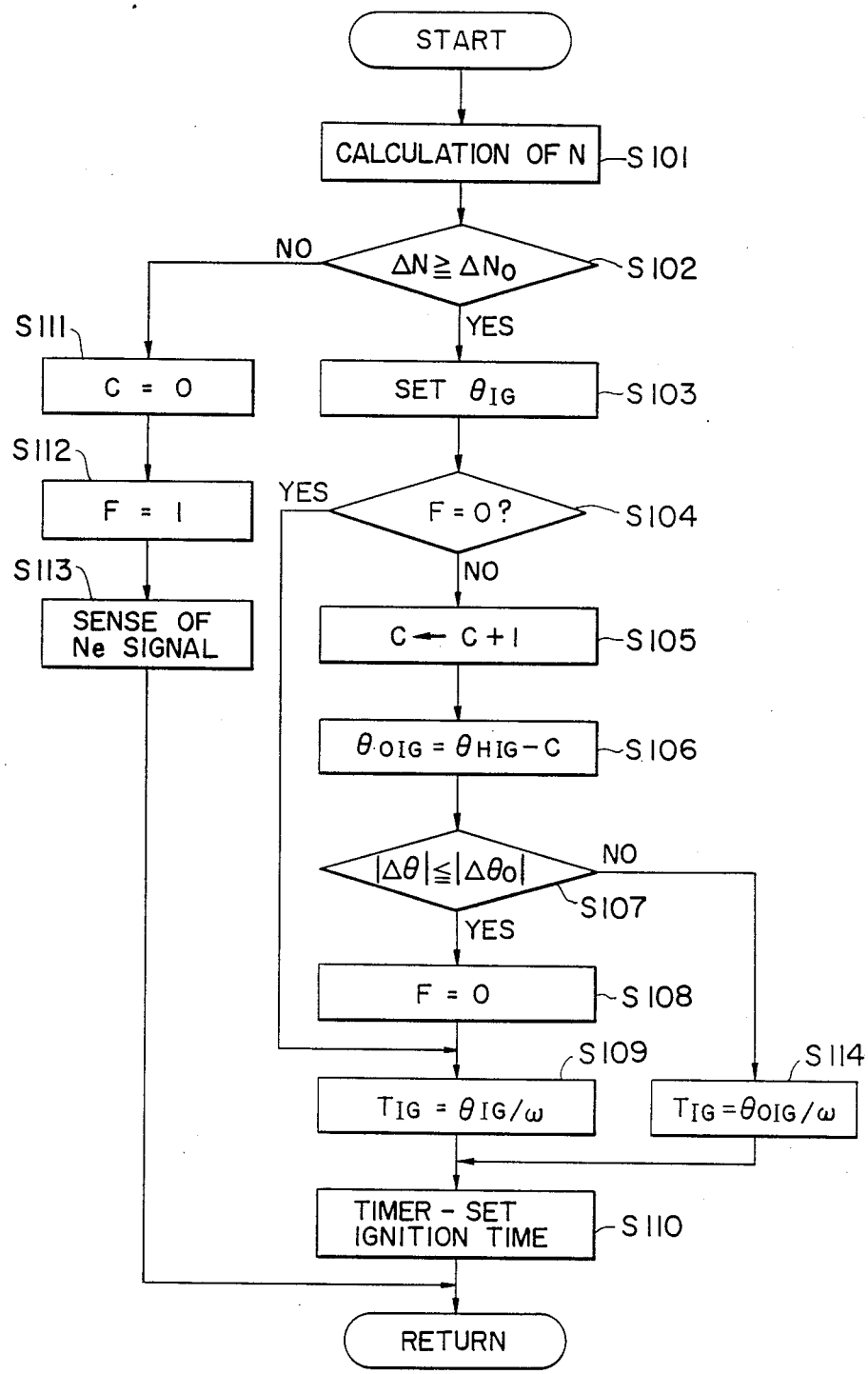

The operation of the embodiment will be described in accordance with the flowchart shown in FIG. 6. This program is executed for each cycle.

At the time of starting the engine, when the key switch is turned ON, the program is executed for each predetermined time. At step S101, the number of the engine revolutions N is calculated in dependency on the output signal from the crank angle sensor 23 after the starter switch is turned ON.

Then, at a step S102, the increasing quantity $\Delta N$ of the engine speed N for a predetermined cycle is compared with the set value $\Delta NO$. When $\Delta N \geq \Delta NO$, the engine is judged to be in a state of complete firing. Program execution therefore proceeds to a step S103. In contrast, when $\Delta N < \Delta NO$, the engine is determined to be in a state before complete firing and program execution proceeds to a step S111.

Before Perfect Firing

When it is judged that the engine is in a state before perfect firing and the program execution proceeds to the step S111, the starting counter is set to C=0. At a step S112, the starting control flag is set to F=1. At a step S113, a reference crank angle signal G is detected, i.e. the signal G is a BTDC$\theta_1$ (e.g., 10°) output from the crank pulse discrimination means 34. This signal G thus detected is output as a fixed ignition signal SPKH. The program of one cycle is thus completed.

Accordingly, before perfect firing is executed, the primary winding of the ignition coil is cut off through the ignition drive means 47 by the fixed ignition signal and ignition plug 15 of a predetermined cylinder is therefore sparked.

After Perfect Firing

On the other hand, when the engine is judged to be in a state of perfect firing at the step S102 and program execution proceeds to a step S103, an ignition timing $\theta$IG is calculated directly or by interpolating calculation from the ignition timing map MP$_{IG}$ by using, as parameters, a fundamental fuel injection quantity (engine load) Tp calculated in dependency on an output signal from the intake air flow sensor 20 and the output signal from the crank angle sensor 23, and the engine speed N calculated in dependency on the output signal from the crank angle sensor 23, respectively. A corrective operation ($\theta IG \leftarrow \theta IG + X$) is applied to the ignition timing $\theta$IG thus calculated by using the ignition timing correction quantity X calculated in dependency on the output signal from the coolant temperature sensor 21. The ignition timing $\theta$IG in a current operating state is thus set. Then, at step S104, a judgment is made as to whether or not the starting control flag F is equal to zero. As a result, when the starting control flag F is equal to zero, the engine is judged to be in an ordinary operating state and program execution proceeds to step S109.

In contrast, when the starting control flag F is equal to 1, the engine is judged to be at an initial state of the perfect firing and program execution shifts to a step S105. At this step, "1" is added to a starting control counter C ($C \leftarrow C+1$). Then, at a step S106, a value of the starting control counter C calculated at the step S105 is subtracted from the fixed ignition timing $\theta$HIG, to therefore set an initial ignition timing $\theta$OIG ($\theta OIG = \theta HIG - C$).

Then, at a step S107, a judgment is made as to whether or not a difference $|\Delta\theta|$ between the ignition timing $\theta$IG set at step S103 and the initial ignition timing $\theta$OIG calculated at the step S106 is within a set value $|\Delta\theta_0|$. As a result, when $|\Delta\theta| \leq |\Delta\theta_0|$, it is judged that starting is completed, so that the program execution proceeds to step S108. In contrast, when $|\Delta\theta_1| > |\Delta\theta_0|$, it is judged that the engine is in a starting state, so the program execution proceeds to step S114.

When the engine is judged to be in a starting state and program execution proceeds to the step S114, the ignition time TIG is set in dependency on the initial ignition timing $\theta$OIG calculated at the step S106 ($TIG = \theta OIG/\omega$).

On the other hand, when the starting is judged to be completed and program execution proceeds to step S108, the starting control flag F is set to zero. Thus, at a step S109, the ignition timing TIG is set in dependency on the ignition timing $\theta$IG set at the step S103 ($TIG = \theta OIG/\omega$).

When the program execution proceeds to step S110, the ignition timing TIG set at step S109 or S114 is set at a timer. In the main routine, counting is initiated by using the signal G as a trigger signal. When the count value reaches the ignition timing TIG, the ignition signal SPK is output. As a result, the primary winding of the ignition coil 33 is cut off through the ignition drive means 47. Thus, the ignition plug 15 of the predetermined cylinder is sparked through the distributor 33.

As described above, since a procedure is taken to gradually advance the ignition timing $\theta$IG from a fixed ignition timing to the ordinary ignition timing control immediately after the perfect firing, the engine is smoothly started up, resulting in an improved starting performance.

As seen from the foregoing description, an ignition timing control system according to the present invention comprises the starting judgment means for determining the starting state of the engine, the ignition timing setting means for setting the ignition timing from the ignition map using the engine load and the engine revolution speed as parameters, respectively, and the initial ignition timing setting means for gradually advancing the ignition timing immediately after it is determined by the starting judgment means that the engine is in the starting state from the fixed ignition timing position to the ignition timing set by the ignition timing setting means. Thus, even in the ignition timing control in which the time control system is applied, a satisfactory starting performance can be obtained, leading to an excellent advantage such that the engine revolution speed can be smoothly increased immediately after starting.

While the presently preferred embodiments of the present invention have been shown and described, it is to be understood that these disclosures are for the purpose of illustration and that various changes and modification may be made without departing from the scope of the invention as set forth in the appended claims.

What is claimed is:

1. An ignition timing control system for an engine having a crank angle sensor for detecting a rotation angle of a crank shaft in order to obtain an engine speed, an intake air flow sensor, a coolant temperature sensor, angular velocity calculation means responsive to the crank angle sensor and engine load calculation means responsive to the intake air flow sensor and the angular velocity calculation means, comprising:

starting judgement means responsive to said crank angle sensor for determining a starting state of the engine, ignition timing setting means responsive to said angular velocity calculation means, engine load calculation means and intake air flow sensor, for setting the ignition timing from an engine map stored in a memory by using an engine load and the engine speed as parameters, respectively, and initial ignition timing setting means responsive to the engine speed and said angular velocity calculation means, for gradually advancing an ignition timing from a fixed ignition timing to a predetermined ignition timing set by the ignition timing setting means immediately after it is determined by said starting judgement means that said engine is in a starting state.

2. The ignition timing control system for the engine as set forth in claim 1, wherein said starting judgment means determines starting of said engine by the engine speed calculated in dependency on a crank pulse sensed by the crank angle sensor, and said ignition timing setting means sets the ignition timing by the number of the engine speed, a fundamental fuel injection quantity and an ignition timing correction quantity respectively calculated in dependency on said crank pulse sensed by said crank angle sensor, an intake air quantity detected by said intake air flow sensor, and coolant temperature sensed by said coolant temperature sensor.

3. The ignition timing control system for the engine as set forth in claim 2, wherein said crank pulse is output from crank pulse discrimination means connected to said crank angle sensor, and said engine speed is calculated by engine revolution speed calculation means in dependency on an angular velocity calculated by angular velocity calculation means connected to said crank pulse discrimination means.

4. The ignition timing control system for the engine as set forth in claim 2, wherein said fundamental fuel injection quantity is calculated by engine load calculation means in dependency on the intake air quantity calculated by intake air quantity calculation means in dependency on a sensed intake air quantity value of said intake air flow sensor.

5. The ignition timing control system for the engine as set forth in claim 2, wherein said ignition timing correction quantity is calculated by ignition timing correction quantity calculation means in dependency on the coolant temperature calculated by the coolant temperature calculation means.

6. The ignition timing control system for the engine as set forth in claim 1, which further comprises:

ignition timing comparator means for making a comparison between an initial ignition timing signal output from said initial ignition timing setting means and an ignition timing signal output from said ignition timing setting means to determine whether or not a difference therebetween is within a set value, to therefore output said initial ignition timing signal when said difference is larger than said set value, and ignition time calculation means for calculating an ignition timing in dependency on either one of an ignition timing signal and an initial timing signal output from said comparator means and a crank pulse sensed by the crank angle sensor and discriminated by crank pulse discrimination means.

7. An ignition timing control system for an engine having a crank angle sensor for producing a crank pulse representing a predetermined crank angle of the engine, an intake air flow sensor for detecting an intake air of the engine, engine speed calculation means responsive to the crank pulse for calculating an engine speed, an engine load calculation means responsive to the intake air and the engine speed for calculating an engine load, comprising:

starting judgement means responsive to said crank pulse for determining a starting state of the engine and for producing a starting state signal;

ignition timing setting means responsive to said engine speed and said engine load for setting an ignition timing from a timing map stored in a memory; and initial ignition timing setting means responsive to said starting state signal for gradually advancing an ignition timing from a fixed ignition timing to a predetermined ignition timing set by said ignition timing setting means.

8. The system according to claim 7, wherein said engine load calculation means is adapted to produce a signal corresponding to a fundamental fuel injection quantity.

9. The system according to claim 7, wherein said starting judgement means is adapted to determine starting of said engine when the engine speed exceeds a set value.

10. The system according to claim 7, further comprising:
   a coolant temperature sensor for detecting a coolant temperature of the engine;
   correction quantity calculation means responsive to said coolant temperature for calculating an ignition timing correction quantity; and
   said ignition timing setting means further is responsive to said ignition timing correction quantity for setting the ignition timing.

11. The system according to claim 7, further comprising:
   crank pulse discrimination means for discriminating said crank pulse from said crank angle sensor to produce a discriminated crank pulse;
   angular velocity calculation means responsive to said discriminated crank pulse for calculating an angular velocity; and
   said engine speed calculation means being responsive to said angular velocity for calculating said engine speed.

12. The system according to claim 7, further comprising:
   ignition timing comparator means for comparing said initial ignition timing with said predetermined ignition timing and adapted to determine whether a difference between said initial ignition timing and said predetermined ignition timing is within a set value, to therefore output said initial ignition timing signal when said difference is larger than said set value; and
   ignition time calculation means for calculating an ignition time in dependency on either one of said predetermined ignition timing and said initial ignition timing output from said comparator means and said angular velocity.

* * * * *